UNITED STATES PATENT OFFICE.

ERNEST MAS, OF NEW YORK, N. Y.

PALMITIN WATERPROOFING COMPOUND AND PROCESS OF MAKING THE SAME.

982,620.  Specification of Letters Patent.  Patented Jan. 24, 1911.

No Drawing. Application filed May 10, 1910. Serial No. 560,518.

*To all whom it may concern:*

Be it known that I, ERNEST MAS, a citizen of the United States, and a resident of the city of New York, borough of Brooklyn, in the county of Kings and State of New York, have invented a new and Improved Palmitin Waterproofing Compound and Process for Making Same, of which the following is a full, clear, and exact description.

My invention relates to a new and improved waterproofing compound and the method of making same, and more particularly relates to the treatment of palmitin in a solid and non-oleaginous condition, so as to make use of same as forming the base for waterproofing compounds associated with other substances in a dry powdered form, to act as a vehicle.

While palmitin is a natural product resulting from the combination of palmitic acid and glycerin, it cannot be found in nature, in a solid non-oleaginous condition, but only associated with oleaginous substances, oleic or margaric acid. It is particularly abundant in palm oil, olive oil, Chinese wood oil, Japan wax and spermaceti, wherefrom it can be extracted or isolated, in a gum-like and non-oleaginous form by well known chemical processes. Having thus been isolated, freed from moisture, oleaginous matters and other impurities, the solid palmitin presents itself in the form of pearly scales, somewhat amorphous, colorless and non-staining; its hardness being superior to that of camphor gum or Japan wax. This solid non-oleaginous palmitin is the material that I am using as forming the base for making waterproofing compounds, primarily intended to render water-repellant and impervious to moisture, any mineral substance in a dry powdered form, or in a solid concrete form, such as silica sand, hydrated lime, clay, gravel, limestone, or any other building material entering into the preparation of wet mortars or cement mortars for the construction of buildings.

I have discovered that of all organic or inorganic substances known in solid or semisolid form, and susceptible of a practical application, owing to their water-repelling properties as a waterproofing material, solid, non-oleaginous palmitin alone, unlike other basic materials, such as oils, greases, tallow, or oleaginous substances used in preparing waterproofing compounds, is odorless, colorless, and non-staining. I have further discovered that solid non-oleaginous palmitin, after having been liquified by fusion, can be thoroughly mixed or incorporated with a large percentage of mineral substances, in a dry powdered form, without causing any agglutination nor changing the pulverulent condition, after cooling; thus making it possible to produce waterproofing compounds in a dry powdered form and at an extremely low cost, in spite of their high degree of waterproofing efficiency.

The water-repelling properties of solid palmitin are equal, if not superior, to those of any vegetable wax, animal or mineral wax, glycerids, and favorably compare with the water-repelling property of such compounds as oleates, stearates, metallic soaps and insoluble lime salts of fatty acids.

Solid non-oleaginous palmitin, after having been freed from watery moisture, oleaginous substances and other impurities, then liquefied by fusion and intimately mixed in the small proportion of five per cent. with ninety-five per cent. of hydrated lime $Ca(OH)_2$, imparts its water-repelling property to the other ninety-five per cent. of calcium hydrate. The calcium hydrate, or slaked lime, thus treated in a dry powder form, is no longer miscible with water. It has lost entirely its well known and distinctive property of forming with water a smooth paste capable of a ready dilution, with formation of milk of lime. The lime thus mixed with palmitin still remains $Ca(OH)_2$, but has become so water-repellent that it acts in water as if it were insoluble, while it is only waterproof. This can be easily verified by shaking vigorously some of the powder in a glass test tube half filled with water. The powder persistently floats on the water surface with the buoyancy of cork; while the non-treated lime powder would immediately absorb water like a sponge, sinking rapidly to the bottom. And what is more remarkable about this waterproofing action of the palmitin upon the lime is that it takes place without any chemical reaction or even partial saponification, each minute particle of the powdered lime being externally coated with a thin film of palmitin, and rendered water-repellent thereby. And what is true with the treatment of hydrated lime or slaked lime in a dry powdered form, with palmitin, is equally true with a similar treatment of silica sand, clay, marble dust or any other mineral substance capable of being mechanically reduced to a dry powdered form. In fact, any mineral substance in a dry powdered form can be used as a vehicle for conveying minute particles of palmitin into cement mortar mixtures, such as used in the construction of buildings, so as to render the said mortar cements integrally waterproof, as soon as they have set, dried and solidified into concrete.

I am aware of the existence of Letters Patent No. 851,247, granted on April 23, 1907 to Spencer B. Newberry, on a process for making Portland cement waterproof; also Letters Patent No. 898,547, granted on September 15, 1908, to Harvey N. Barrett on a process for the manufacture of insoluble lime salts of fatty acids; but in both instances, the waterproofing materials used in the Portland cement is a lime stearate or insoluble lime salt of a fatty acid. And this is not the result, as in my process, of a simple mechanical mixture of a waterproofing ingredient with powdered lime, acting merely as a vehicle or conveying medium in a dry powdered form, but it is the result of the chemical action of stearic acid upon a chemical base, namely Ca(OH)$_2$, at a very high temperature, as high as four-hundred-and-forty degrees Fahrenheit, when both the stearic acid and the calcium oxid undergo a radical change and a complete atomic transformation, through a patented process, which, in practice, involves complex operations and requires the skilled supervision of a competent chemist; while my process of making palmitin waterproofing compounds for an identical purpose, is simple, inexpensive, purely mechanical, and requires no skilled labor. I am also aware of the existence of patented processes in which waxes of the mineral, the animal, or the vegetable kingdom, glycerids and non-glycerids, have been used in the making of waterproofing compounds, in combination with hydrated lime or other materials in a dry powder form, such as for instance Portland cement, but in all such cases, the non-staining quality of the basic waterproofing material was disregarded, and never before was a solid non-oleaginous palmitin used as the basic material for waterproofing purposes as it is the case with my present process.

For carrying out my process of making palmitin waterproofing compounds in a dry powdered form, I simply take the solid, non-oleaginous palmitin, and liquefy the same by fusion, which requires but one-hundred-and-fifty degrees Fahrenheit; then put the liquefied palmitin in a suitable mixing machine and mechanically incorporate with it a mineral substance in a dry powdered form, using a very small percentage of the palmitin, say five per cent. palmitin to ninety-five per cent. of the dry powdered substance and so as not to modify the dry pulverulent condition of the resulting mixture after cooling. Any mineral substance, in a dry powdered form, could be used as a suitable vehicle or conveying medium to carry the minute particles of palmitin, but I use in preference dry powdered hydrated lime, on account of its cheapness, light specific gravity and whiteness. The chemical properties of lime, as an alkaline base, play no part whatever in my process. The lime acts not as a reagent, but as a conveying medium, in a dry powdered form, to carry the palmitin particles mechanically mixed in a state of extreme mechanical division, so as to render the finished product, or palmitin waterproofing compound, in dry powdered form, readily miscible with any other material in a dry powdered form, and such as silica sand, quartz, gravel, or Portland cement mortars to be rendered waterproof, after the setting thereof.

Having thus described my invention, I claim as new and desire to secure by Letters Patent:—

1. A waterproofing compound, consisting of palmitin, substantially free from oleaginous substances, distributed through, and carried by, a powdered vehicle.

2. A waterproofing compound, consisting of palmitin, substantially free from oleaginous substances, distributed through, and carried by, a vehicle consisting of a mineral substance in a dry powdered form.

3. A waterproofing compound, consisting of palmitin, substantially free from oleaginous substances, distributed through, and carried by, a vehicle consisting of hydrated lime.

4. The process of making a waterproofing compound, which consists in fusing said palmitin free from oleaginous substances, and then mixing mechanically the fused palmitin with a powdered vehicle.

5. The process of making a waterproofing compound, which consists in fusing solid palmitin, free from oleaginous substances, and then mixing mechanically the fused palmitin with a powdered vehicle substantially in the proportions of five parts palmitin to ninety-five parts vehicle.

6. The process of making a waterproofing compound, which consists in heating solid palmitin to a temperature as low as one-hundred-and-fifty degrees Fahrenheit, until liquefied, and then mixing the liquefied palmitin mechanically with a powdered vehicle, substantially in the proportions of five parts palmitin to ninety-five parts vehicle.

In testimony whereof I have signed my name to this specification in the presence of two subscribing witnesses.

ERNEST MAS.

Witnesses:
 HORATIO WHITING,
 PHILIP D. ROLLHAUS.